United States Patent
Huang et al.

(10) Patent No.: US 7,332,146 B1
(45) Date of Patent: Feb. 19, 2008

(54) METHOD FOR ZERO EMISSION LIQUID HYDROGEN PRODUCTION FROM METHANE AND LANDFILL GAS

(75) Inventors: Cunping Huang, Cocoa, FL (US); Nazim Muradov, Melbourne, FL (US); Ali T. Raissi, Melbourne, FL (US)

(73) Assignee: Research Foundation of the University of Central Florida, Inc., Orlando, FL (US)

( * ) Notice: Subject to any disclaimer, the term of this patent is extended or adjusted under 35 U.S.C. 154(b) by 300 days.

(21) Appl. No.: 11/148,778

(22) Filed: Jun. 8, 2005

Related U.S. Application Data

(60) Provisional application No. 60/578,212, filed on Jun. 9, 2004.

(51) Int. Cl.
 *C01B 3/02* (2006.01)
 *C01B 3/22* (2006.01)
 *C01B 3/24* (2006.01)
 *C01B 3/26* (2006.01)
 *C01B 31/20* (2006.01)

(52) U.S. Cl. .............................. 423/648.1; 423/437.1; 423/650; 423/651; 423/652

(58) Field of Classification Search ............. 423/648.1, 423/437.1, 650, 651, 652
See application file for complete search history.

(56) References Cited

U.S. PATENT DOCUMENTS

| | | | |
|---|---|---|---|
| 4,000,990 A | * | 1/1977 | Bingham ..................... 95/103 |
| 4,869,894 A | * | 9/1989 | Wang et al. ................ 423/650 |
| 5,669,960 A | * | 9/1997 | Couche ......................... 95/96 |
| 6,066,307 A | * | 5/2000 | Keskar et al. ............ 423/648.1 |
| 6,919,062 B1 | * | 7/2005 | Vasileiadis et al. ....... 423/437.1 |
| 2004/0265224 A1 | * | 12/2004 | Papavassiliou et al. ..... 423/651 |
| 2006/0137245 A1 | * | 6/2006 | Kenefake et al. ............. 48/61 |

OTHER PUBLICATIONS

Howard C. Rowles, et al., "Cryogenic Hydrogen Purification for Refiners," Mar. 1986, Energy Progress (vol. 6, No. 1) pp. 25-32.
Cunping Huang, et al., "Analysis of Liquid Hydrogen Production from Methane and Landfill Gas," Jul. 2, 2004, 15th World Hydrogen Energy Conference, Yokahama, Japan, pp. 1-8.

* cited by examiner

*Primary Examiner*—Wayne A. Langel
(74) *Attorney, Agent, or Firm*—Brian S. Steinberger; Phyllis K. Wood; Law Offices of Brian S. Steinberger, P.A.

(57) ABSTRACT

Processes, methods, systems and devices for zero emission liquid hydrogen production directly from a variety of methane sources, such as natural gas and landfill gas, are disclosed. Five embodiments of plant designs for liquid hydrogen production are presented. The embodiments combine hydrogen production and liquefaction into a single process to produce liquid hydrogen directly via methane containing gases; thus, eliminating the conventional technology of pressure swing adsorption process for gas mixture separation. The innovative process can be applied to produce high purity liquid hydrogen with no carbon dioxide emission to the atmosphere; and can also co-produce highly pure solid carbon and liquid carbon dioxide as by-products for industrial application. The invention has provided advantages over conventional approaches that result in up to approximately 85% of first low efficiencies and approximately 56% of second law efficiency, up to approximately 100% of hydrogen and methane recovery, and a very high purity of liquid hydrogen (99.9999%).

12 Claims, 8 Drawing Sheets

METHOD FOR ZERO EMISSION LIQUID HYDROGEN PRODUCTION FROM METHANE AND LANDFILL GAS

This invention claims priority based on U.S. Provisional Application Ser. No. 60/578,212 filed on Jun. 9, 2004 and the invention was funded in part by the National Aeronautics and Space Administration through Glenn Research Center (NASA-GRC) under Grant NAG32751.

FIELD OF THE INVENTION

This invention relates to liquid hydrogen ($LH_2$) production processes, and in particular to methods, systems and devices for liquid hydrogen production from methane, landfill gas (LFG), gob gas or natural (NA) that combines gaseous hydrogen ($GH_2$) production and cryogenic hydrogen liquefaction in a single process, producing high purity liquid hydrogen ($LH_2$) with zero emissions.

BACKGROUND AND PRIOR ART

A typical conventional liquid hydrogen ($LH_2$) production process can be separated into three steps: (1) gaseous hydrogen production; (2) separating hydrogen from a gaseous mixture; and, (3) liquefying gaseous hydrogen to liquid hydrogen ($LH_2$). As shown in FIG. 1, $LH_2$ production begins with the well-known Steam Methane Reforming (SMR) process, in which a gas mixture containing carbon monoxide (CO), carbon dioxide ($CO_2$), water and methane residues are mixed together with hydrogen in a Steam Methane Reformer to produce hydrogen ($H_2$) rich gas. The hydrogen ($H_2$) rich gas mixture is then separated through several pairs of adsorption columns in a purification process called Pressure Swing Adsorption (PSA). About 85% of the hydrogen produced is then liquefied into $LH_2$, with purity ranging from 99.90 to 99.99%. The remaining 15% of hydrogen, together with remaining CO and methane ($CH_4$), are burned in an incinerator to produce $CO_2$ and water, yielding 11.8 kg of $CO_2$ per 1 kg of hydrogen ($H_2$) produced through this process.

The disadvantages of the Pressure Swing Adsorption (PSA) process include, but are not limited to, low process efficiency, low hydrogen recovery from a gas mixture, and the production of off-gases, containing high concentrations of carbon monoxide (CO); $H_2$ and methane ($CH_4$) that are generally burned to recover only the fuel value of the combustible gases, thereby wasting $CH_4$ and CO as $H_2$ production components. Another disadvantage of PSA systems related to the level of hydrogen purity obtainable. Normally, $H_2$ purity greater than 99.9995% is required for use in aerospace, as a space travel propellant. In case of hydrogen fuel cells, such applications do not tolerate contaminants such as carbon monoxide (CO) and hydrocarbons at levels exceeding a few parts per million (ppm), because the contaminants poison the platinum catalysts utilized in fuel cells. Thus, $GH_2$ production through PSA purification alone cannot meet high purity standards. In order to do so an $H_2$ purification procedure must be accomplished prior to the liquefaction.

The present invention provides methods, systems and devices that overcome the disadvantages of the conventional process shown in FIG. 1. Five embodiments of the invention have been developed through the use of the chemical engineering simulation tools HYSYS™ and Aspen Plus™ to determine the process efficiencies and to calculate $CO_2/H_2$ ratios.

SUMMARY OF THE INVENTION

The first objective of the present invention is to provide cryogenic systems, methods and devices to produce liquefy hydrogen directly from methane or landfill gas at the same time to separate a mixture of hydrogen rich gases.

The second objective of the present invention is to provide methods, systems and devices for increasing the process efficiency for the production of liquid hydrogen.

The third objective of the present invention is to provide methods, systems and devices to improve the level of hydrogen recovery from its admixture with other gases.

A fourth objective of the present invention is to provide methods, systems and devices to decrease the high carbon dioxide ($CO_2$) to hydrogen ($H_2$) ratio of conventional processes for $LH_2$ production.

A fifth objective of the present invention is to provide methods, systems and devices to produce liquid hydrogen with zero green house gas emissions.

The preferred embodiment of the invention is a process for liquid hydrogen ($LH_2$) production comprising the steps of: partial oxidation of methane containing gas producing heat; thereafter pyrolyzing the remaining methane to produce hydrogen and carbon as primary components of a resulting gas mixture containing hydrogen ($H_2$), carbon monoxide (CO), carbon dioxide ($CO_2$), methane ($CH_4$), water ($H_2$)) and trace amounts of hydrocarbons; cryogenically separating said gas mixture yielding $H_2O$, liquid carbon dioxide ($LCO_2$), and low temperature gaseous $H_2$; recycling the CO and $CH_4$ separated from the said gas mixture through a steam methane reforming (SMR) reactor to further produce hydrogen; cooling the gaseous hydrogen until it reached its dew point; and, liquefying said cold gaseous hydrogen into $LH_2$ by applying small amounts of additional cooling energy.

A first embodiment of the invention is a cryogenic method for hydrogen cryogenic liquefaction and hydrogen separation for liquid hydrogen ($LH_2$) production comprising the steps of: (a) producing a hydrogen rich gas mixture containing $H_2$, CO, $CO_2$, $CH_4$, $H_2O$ and trace amounts of hydrocarbons; (b) cryogenically separating the gas mixture of step (a) resulting in $H_2O$, and liquid carbon dioxide ($LCO_2$); (c) separating low temperature gaseous $H_2$ and gas mixture of CO and $CH_4$; (d) recycling the CO and $CH_4$ of the gas mixture to further produce hydrogen rich gas; (e) mixing the hydrogen rich gas from step (d) with the hydrogen rich gas mixture in step (a) to form a closed loop for CO and $CH_4$ gas mixture; (f) further cooling the low-temperature gaseous hydrogen until it is liquefied; and (g) producing $LH_2$ without $CO_2$ emission.

In the embodiment, the input hydrogen concentration of step (a) is greater than 70% resulting in a cryogenic separation efficiency which exceeds 90%, the hydrogen recovery is as high as approximately 99.99% with a purity of approximately 99.9999%, the high purity $LCO_2$ obtained in step (b) is sequestered to avoid emission of greenhouse gas and the high purity $LCO_2$ obtained in step (b) is served as a co-product. The producing step includes reacting $CH_4$ and water to produce the gas mixture containing $H_2$, CO, $CO_2$, $CH_4$, $H_2$ or reacting $CH_4$ and oxygen to produce the gas mixture containing $H_2$, CO, $CO_2$, $CH_4$, $H_2O$. The recycling step includes low temperature reaction of gas mixture of CO and $CH_4$, to convert the CO into $CO_2$ and $H_2$ and high temperature reaction of gas mixture of CO and $CH_4$, to convert the $CH_4$ into $CO_2$ and $H_2$ or alternatively, reacting the CO and $CH_4$ mixture with water to convert both CO and $CH_4$ into $CO_2$ and $H_2$ simultaneously at one reactor or separating CO and $CH_4$ mixture into CO and $CH_4$, reacting the CO with $H_2O$ at a water shift gas reactor to convert the CO into $CO_2$ and $H_2$ and reforming the $CH_4$ with $H_2O$ at a steam methane reforming reactor to convert the $CH_4$ into $CO_2$ and $H_2$.

Several typical methods can be applied to produce hydrogen from methane. These are steam reforming (SMR), partial oxidation, pyrolysis, and autothermal pyrolysis (ATP) and autothermal SMR processes. In addition, the intermediate product, CO, can be converted to hydrogen via a Water Gas Shift Reaction (WGSR) to produce hydrogen and carbon dioxide. By combining these methods with a cryogenic separation process we can form a number of flow diagrams for $LH_2$ production directly from $CH_4$. One embodiment of the present invention uses the $CH_4$ autothermal pyrolysis (ATP) process to produce $H_2$ and carbon in order to reduce the production of $CO_2$. The energy required for $CH_4$ pyrolysis is derived from the partial combustion of $CH_4$ in the feedstock, resulting in a zero energy requirement for this step. The outlet steam of the autothermal reactor is a gaseous mixture containing $CH_4$, $H_2$, CO, $CO_2$ and $H_2O$. The gaseous mixture is then separated into its components by cryogenic distillation. The separated portion containing $CH_4$ and CO are passed through a High Temperature Gas Conditioning Reactor (HTGCR) or a Low Temperature Gas Conditioning Reactor (LTGCR) to produce hydrogen. The recycled steam is then mixed with the main steam from the $CH_4$ autothermal pyrolysis reactor and redirected or recycled into the separation process.

Further objectives and advantages of this invention will be apparent from the following detailed description of the presently preferred embodiments which are illustrated in the accompanying drawings.

DESCRIPTION OF THE PREFERRED EMBODIMENTS

Before explaining the disclosed embodiment of the present invention in detail it is to be understood that the invention is not limited in its application to the details of the particular arrangements shown since the invention is capable of other embodiments. Also, the terminology used herein is for the purpose of description and not of limitation.

A glossary of frequently used terms is provided below.
ATP stands for autothermal pyrolysis
CO is carbon monoxide.
$CO_2$ is carbon dioxide.
$CH_4$ is methane.
$GH_2$ is gaseous hydrogen.
$H_2$ is used alternately with the word hydrogen.
$H_2O$ is water
HTGCR stands for high temperature gas conditioning reactor
HYSYS is a chemical engineering simulation software
$LCO_2$ stands for liquid carbon dioxide.
$LH_2$ stands for liquid hydrogen.
LTGCR stands for low temperature gas conditioning reactor
SMR stands for Steam Methane Reforming reactor.
WGSR stands for Water Gas Shift Reactor
$\eta_{Separation}$: hydrogen cryogenic separation efficiency
$\eta_{1st}$: The first law efficiency of processes
$\eta_{2nd}$: the second law efficiency of processes
$\eta_{Carnot}$: Carnot efficiency
CE: cooling energy
HE: heating energy
CondE: condenser energy requirement for a distillation column
ReE: reboiler energy requirement for a distillation column
CompE: compressor energy requirement
HX: heat exchanger
$R_{Energy/LH2}$: the ratio of total input energy per mole of liquid hydrogen produced
$R_{CO2/H2}$: the ratio of weight (gram) of $CO_2$ produced per gram of liquid hydrogen produced
NCO2 ($\eta_{LH2}$): mole number of $CO_2$ (liquid hydrogen)

Figure 1:
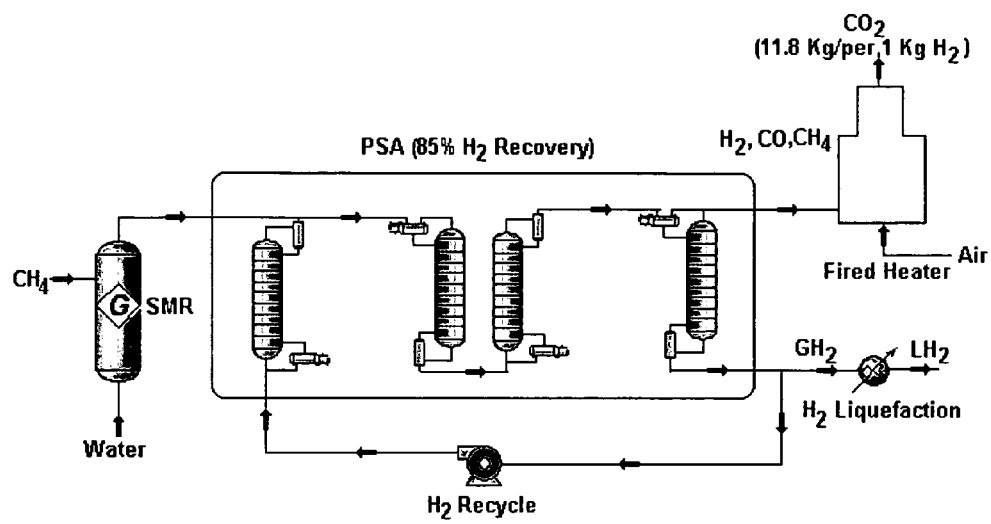
FIG. 1 shows conventional liquid hydrogen ($LH_2$) production using the Pressure Swing Adsorption (PSA) process. (Prior Art)
Figure 2:
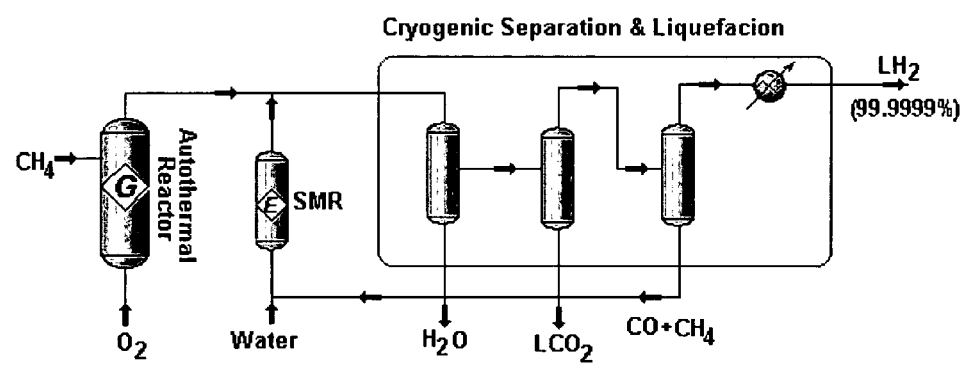
FIG. 2 shows a concept of the cryogenic $LH_2$ production process of the present invention.

The novel and innovative design of the present invention is based on the concept of using an existing cryogenic system, such as the cryogenic cooling system, to liquefy hydrogen and at the same time to separate a mixture of gases. FIG. 2 is a flow diagram of the cryogenic $LH_2$ production process of the present invention. The process begins with the partial oxidation of methane, producing heat, which is used for the pyrolysis of the remaining methane to produce hydrogen and carbon. A gas mixture containing $H_2$, CO, $CO_2$, $CH_4$, $H_2O$ and trace amounts of hydrocarbons from the reactor are then separated cryogenically, yielding $H_2O$, liquid carbon dioxide ($LCO_2$), and low-temperature gaseous $H_2$. The CO and $CH_4$ are then recycled through a steam methane reforming (SMR) reactor to further produce hydrogen. The high purity $LCO_2$ can serve as a co-product or can be sequestered to avoid emission of greenhouse gas.

During the separation, hydrogen is cooled step by step, gradually reaching its dew point. Applying small amounts of additional cooling energy, cold gaseous hydrogen is liquefied into $LH_2$. In this process, methane is completely converted into hydrogen and $LCO_2$ because CO and remaining $CH_4$ are recycled in the system without outlets.

Starting materials for the present invention can include methane, landfill gas (LFG), gob gas or natural gas to produce a gaseous hydrogen ($GH_2$) mixture. The gas mixture is separated through the use of a cryogenic purification process, while at the same time hydrogen is separated from its mixture and further liquefied into liquid hydrogen.

Five embodiments have been developed through the use of the chemical engineering simulation software HYSYS™ and Aspen Plus™ to confirm the process efficiencies and to calculate carbon dioxide to hydrogen ratios.

The total energy requirements for $LH_2$ production from a gas mixture (hydrogen, carbon monoxide, methane, carbon dioxide, water and hydrocarbons) via a cryogenic process is expressed in Equation 1 below:

$$\Delta H_{Total} = (\Delta H_{Cooling} + \Delta G_{Separating} + \Delta H_{Recovering})_{Mixture} + \Delta H_{Liquefaction} \quad (1)$$

While the first-law efficiency of the cryogenic separation is defined in Equation 2:

$$\eta_{Separation} = \frac{(\Delta H_{Cooling} + \Delta H_{Liquefaction})_{Hydrogen}}{\Delta H_{Total}} \quad (2)$$

Figure 3:
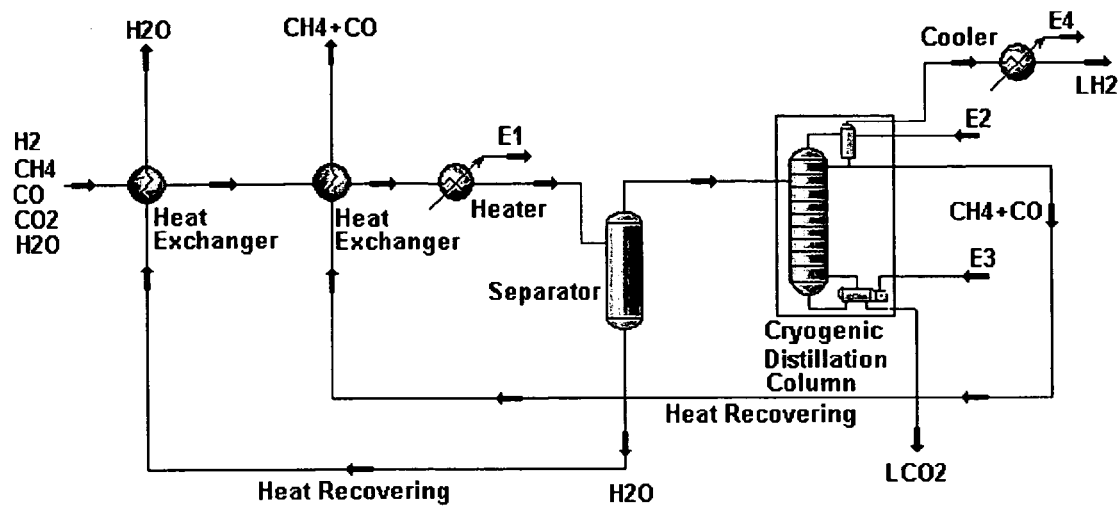
FIG. 3 is a flow diagram illustrating the calculation of the efficiency for the cryogenic separation in the process of the present invention.

A HYSYS™ 3.0 simulation flow diagram of hydrogen separation and liquefaction is illustrated in FIG. 3. In a cryogenic system at elevated pressures, both the vapor and liquid phases are far from being ideal systems. In the simulation the Peng Robinson Equation of State was selected as a fluid package since it is considered applicable for both non-ideal vapor and solution systems. The tray efficiencies of the distillation column are assumed to be 95%. No heat loss is considered for heat exchangers.

In FIG. 3, a gas mixture is fed to an autothermal $CH_4$ pyrolysis reactor containing $H_2$, CO, $CO_2$, $CH_4$ and $H_2O$. The gas compositions are calculated from a Gibbs reactor using AspenPlus™ for the autothermal $CH_4$ decomposition of 0.452 kmol of $CH_4$ mixed with 0.0904 kmol of $O_2$ at a temperature of 900° C. and 1200 kPa pressure. FIG. 3 represents the separation efficiency calculation: P=1.2 MPa, $\Delta H_{Total}=2.666 \times 10^4$ kJ/hr, hydrogen recovery exceeds 99.99%.

Figure 4:
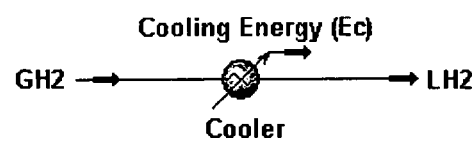
FIG. 4 is a diagram of the total energy requirement for cooling gaseous hydrogen to liquid hydrogen.

FIG. 4 shows a process for calculating the energy required for pure $H_2$ cooling and liquefaction under the same conditions as indicated in FIG. 3. In FIG. 4, a flow diagram is used to calculate the energy requirements (Ec) for the conversion from gaseous hydrogen ($GH_2$) to liquid hydrogen $LH_2$, using the equation P=1.2 MPa, $\Delta H_{CE-2}=2.281 \times 10^4$ kJ/hr.

Based on FIGS. 3 and 4, the total energy required for the separation and liquefaction of the hydrogen gas mixture in FIG. 3 is determined, taking into account the heat recoveries. With 71.02% of $GH_2$ concentration, the separation efficiency defined in Equation (2) can be determined as $\eta_{Separation} = (2.281 \times 10^4/2.666 \times 10^4)*100\%=85.56\%$, indicating that approximately 86% of the energy is used for $LH_2$ production, while approximately 14% is used for the separation of gas mixture during the cryogenic process.

Several factors, discussed below, have a bearing on separation efficiency. The input concentration of hydrogen plays an important role in the determination of efficiency. Equation (2) above predicts that for two extreme conditions, inlet $H_2$ concentrations of 100% and 0%, the efficiencies should be 100% and 0% respectively.

Figure 5:
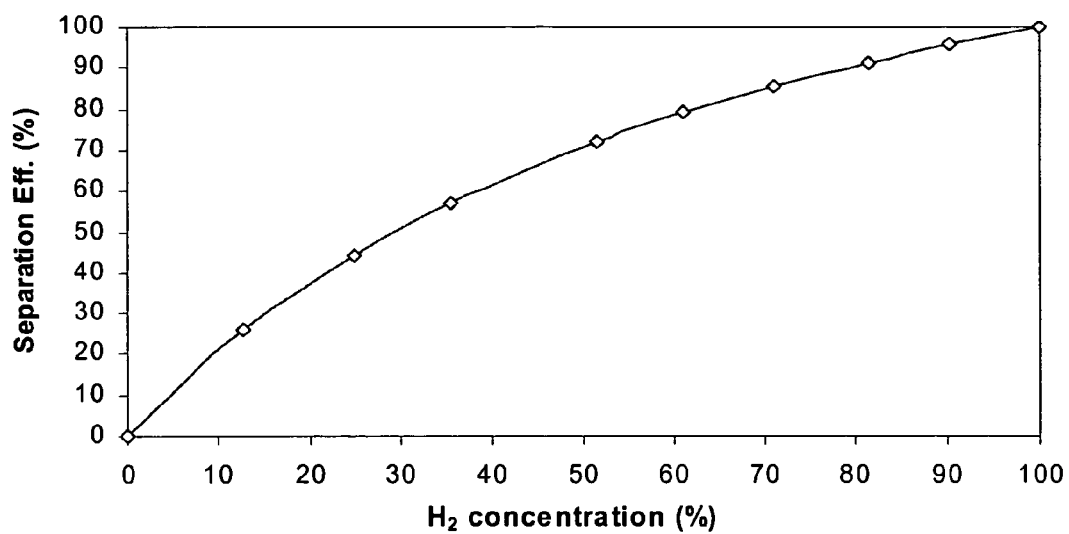
FIG. 5 is a graph of cryogenic separation efficiency versus the inlet hydrogen concentration in a gaseous mixture.

The efficiency calculation based on FIG. 4 is illustrated in FIG. 5 which shows that cryogenic separation efficiency increases with the increase of inlet $GH_2$ concentration, but it is a nonlinear increase. If a separation efficiency of 70% is required, the molar concentration of inlet $GH_2$ in the inlet steam must be more than 50% in its gaseous mixture. When the input hydrogen concentration is greater than 70%, the cryogenic separation efficiency exceeds 90%. On the other hand, if the $H_2$ recovery from the cryogenic separation process is defined as: ($LH_2$ inlet flow rate/$GH_2$ flow rate) *100%, it is concluded from FIGS. 3 and 4 that a cryogenic separation system efficiency is greater than 99%, and it increases with the inlet gaseous hydrogen ($GH_2$) concentration. Other components in the mixture, carbon monoxide (CO), methane ($CH_4$,) and water ($H_2O$) do not significantly affect the separation efficiency since the cooling energy required for condensing these components can be recovered through use of heat exchangers. The reason for the weak influence of $LH_2$ purity on separation efficiency is that the relative volatility of hydrogen to methane in a typical cryogenic process is greater than 200 as reported by H. C. Rowles et al. in "Cryogenic Hydrogen Purification for Refiners" *Energy Progress* 1986, Vol 6 (1), pages 25-32.

The calculation above indicates that cryogenic separation technique is a highly efficient process because the cooling energies can be recovered. Based on fundamentals, five process diagrams shown in FIGS. 6-10 provide examples for the production of $LH_2$ according to the present invention. In each of the Figures, the following components and their functions are provided when referring to each Embodiment.

Heater 1, Heater 2, Heater 3, Heater 4 can include, but not be limited to, an electric oven, gas oven and the like.

Cooler 1, Cooler 2 can include, but not be limited to, cryogenic coolers and the like.

Cooler 3 can include, but not be limited to, a water cooler and the like.

HX-1, HX-2, HX-3, HX-4, HX-5 can include, but not be limited to, a heat exchanger and the like.

$H_2O$ separator is used to separate water from hydrogen contended gas mixtures.

MIXER-1 and MIXER-2 mix incoming gases together.

Distillation Column can be a cryogenic distillation device that separates gas mixtures.

$CH_4$ Auto Thermal Reactor decomposes methane into hydrogen and carbon.

CO WGSR is a carbon monoxide water gas shift reactor that shifts carbon monoxide (CO) to carbon dioxide ($CO_2$) and shifts water to hydrogen.

$CH_4$ SMR is a steam methane reforming reactor that uses methane and water to produce hydrogen and carbon dioxide.

Figure 6:
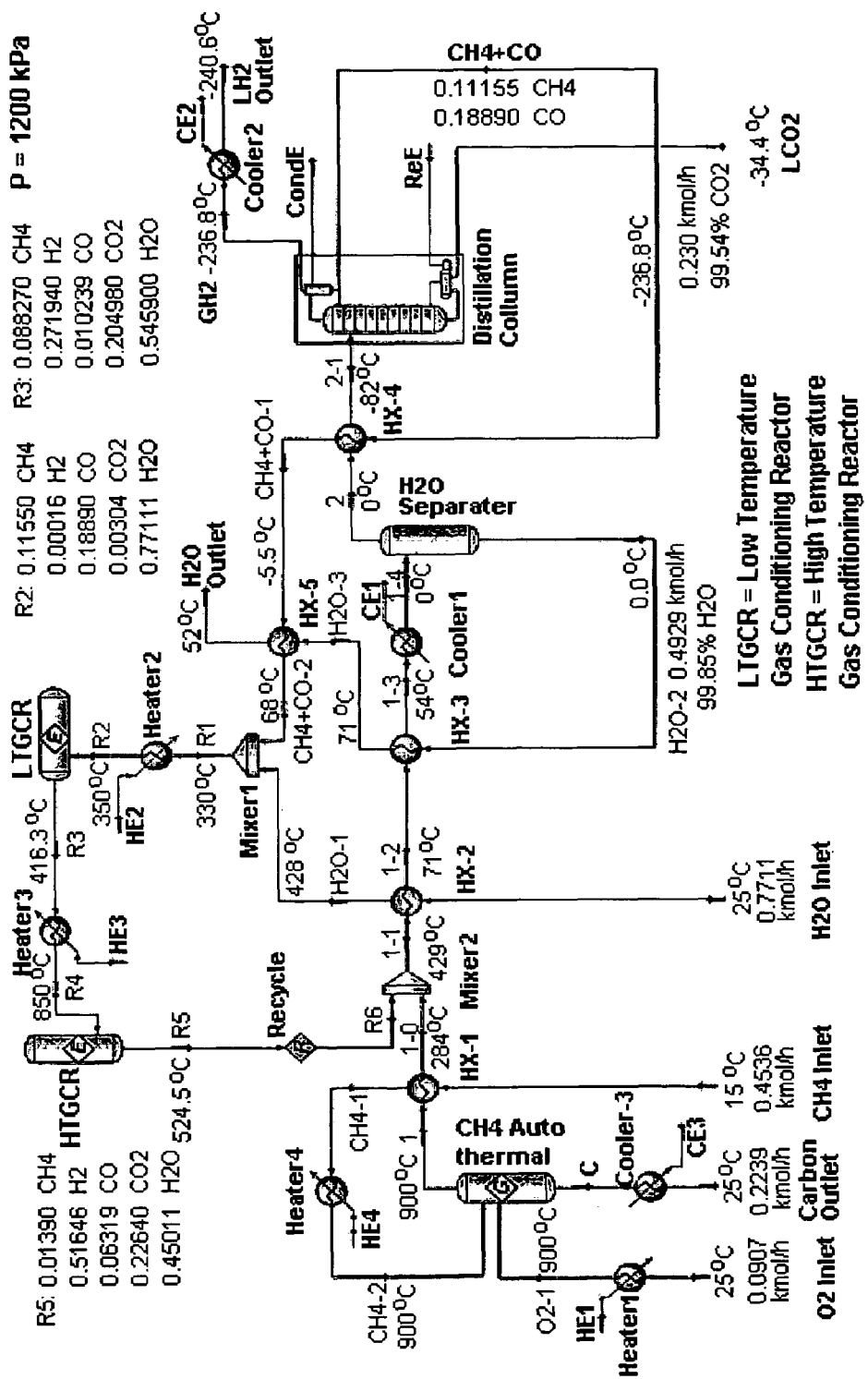
FIG. 6 is a flow diagram of the present invention when there is no separation of methane and carbon monoxide and the gaseous mixture is passed through a low temperature gas conditioning reactor (LTGCR) and a high temperature gas conditioning reactor (HTGCR). (Embodiment 1)

In Embodiment 1, after cryogenic separation, methane and carbon monoxide are not separated in the process, and are passed through a high temperature gas conditioning reactor (HTGCR) and a low temperature gas conditioning reactor (LTGCR) as shown in FIG. 6.

The flow diagram in FIG. 6 for production of $LH_2$ consists of a process that can be separated into three stages. The first stage is, the methane autothermal pyrolysis reaction stage wherein methane and oxygen are heated to 900° C. and mixed in a Gibbs reactor in a ratio of $CH_4:O_2=1:0.2$. Twenty percent of the methane is combusted, releasing the exact amount of heat required for the pyrolysis of the remaining 80% methane to produce hydrogen and carbon. The gas mixture of methane, hydrogen, carbon monoxide, carbon dioxide, water and trace amounts of hydrocarbons is sent to stage 2, cryogenic separation.

During cryogenic separation (stage 2), water and pure carbon dioxide are separated in their liquid forms, while the remaining gas mixture is distilled to separate the high purity and low temperature $GH_2$ and a mixture of $CH_4$ and CO. $GH_2$ is then then liquefied to form $LH_2$ while the mixture of carbon monoxide and methane is sent to gas conditioning reactors (HTGCR and LTGCR).

Stage 3 receives The mixture of carbon monoxide and methane is recycled for the production of hydrogen through HTGCR and LTGCR reactors. The results for these two reactors were calculated based on the HYSYS™ 3.0 equilibrium program and reactions of $CO+H_2O \rightarrow H_2+CO_2$ and $CH_4+H_2O \rightarrow 3H_2+CO_2$. The outlet steam R6 is then mixed with the main stream 1-0 from the methane autothermal pyrolysis reactor in stage 1 and then sent to stage 2 with water separator and cryogenic distillation column for component separation.

Energy flow and process efficiencies are calculated and given in Table 1. Compared to the current commercial hydrogen production through SMR plus PSA separation system, not only can the new process produce 99.9999% purity of $LH_2$ with up to 99.99% of hydrogen recovery, but it can produce valuable co-products such as carbon and pure liquid carbon dioxide. In addition to high efficiency, the system is very stable with respect to temperature changes for HTGCR and LTGCR. While the temperature of the gas mixture increases from 250° C. to 900° C., the output of 1.1852 kgmole/hr of $LH_2$ remains constant, indicating that the process has a high capacity to tolerate system disturbance. For example, in FIG. 6, the gas inlets and outlets list approximate temperature and flowrates. The approximate units shown can vary up to approximately ±10%.

Figure 7:
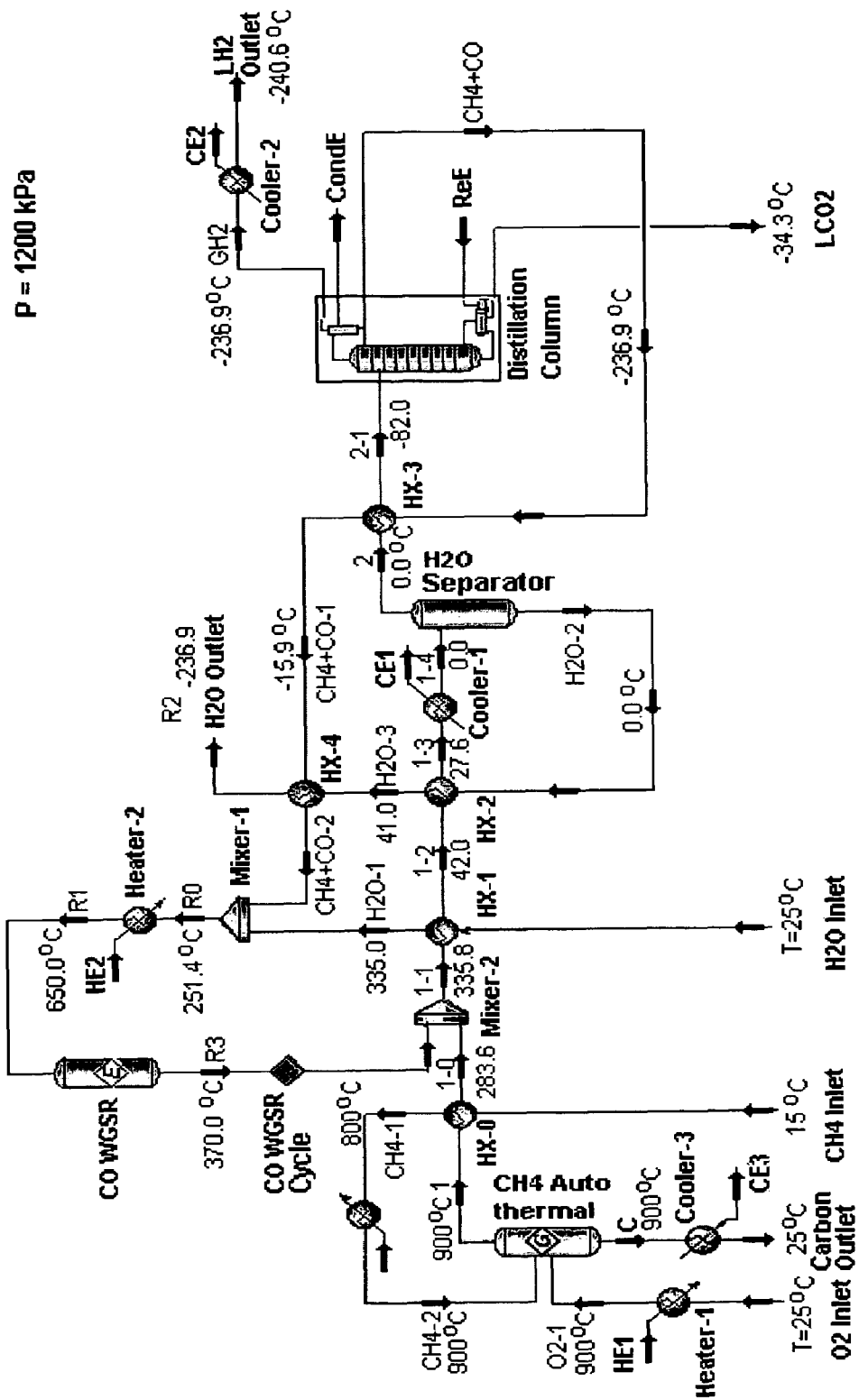
FIG. 7 is a flow diagram of the present invention when there is no separation of methane and carbon monoxide and no Steam Methane Reformer (SMR) for recycled $CH_4$+CO mixture. (Embodiment 2)

Referring now to FIG. 7 (Embodiment 2), methane and carbon monoxide are not separated after distillation column and the mixture is recycled in a water gas shift reactor. FIG. 7 shows a modified flow diagram based on Embodiment 1. The effect of the WGSR temperature is listed in Table 3, showing the stability of the process. As compared to Embodiment 1, Embodiment 2 is simpler, with a increased efficiency.

Figure 8:
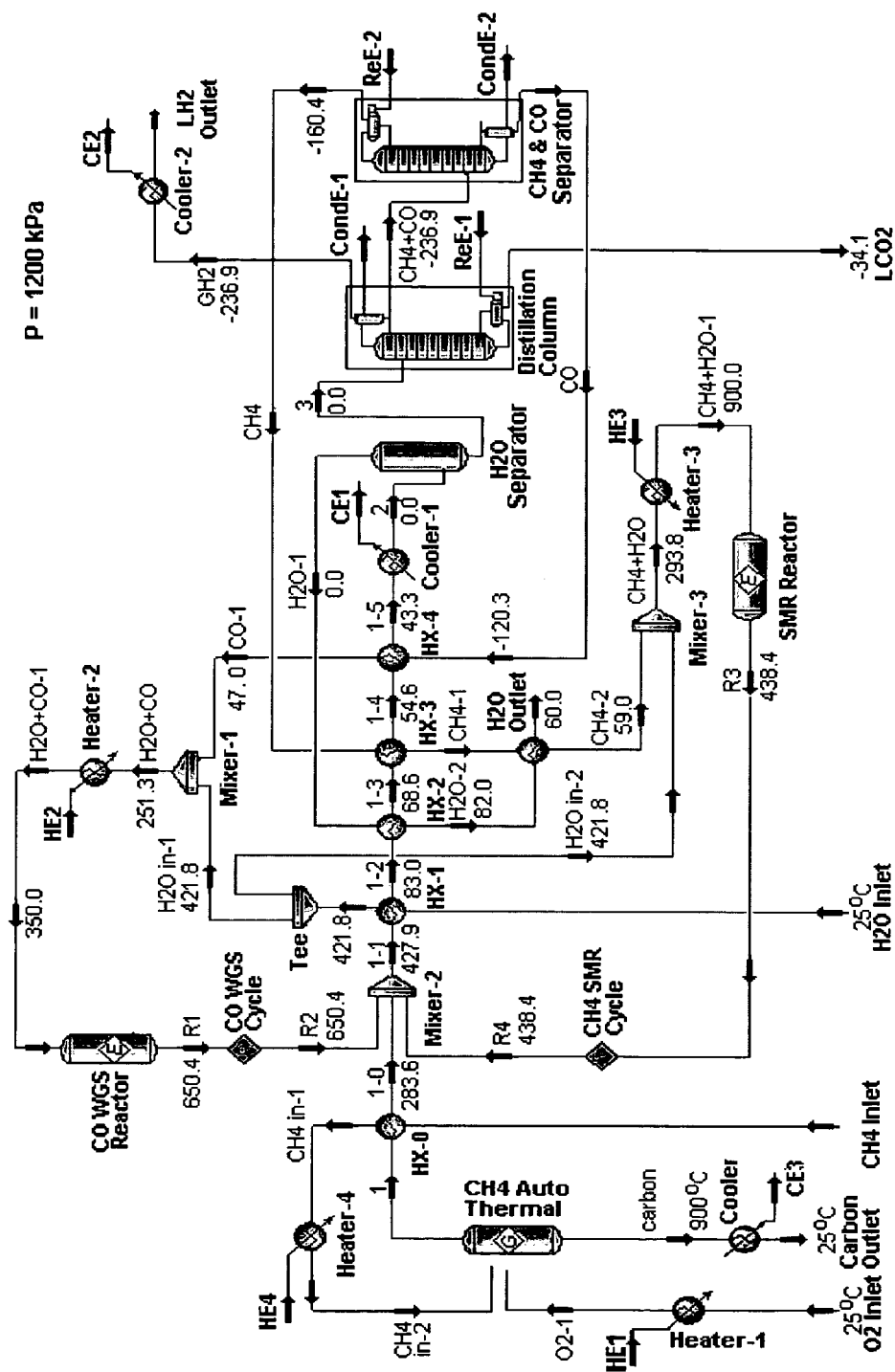
FIG. 8 is a flow diagram of the present invention when carbon monoxide (CO) is separated from methane and CO passes through the Water Gas Shift Reactor (WGSR) and methane passes through the Steam Methane Reformer (SMR). (Embodiment 3)

In Embodiment 3, carbon monoxide (CO) and methane ($CH_4$) are separated; CO passes through a WGSR while $CH_4$ is sent to a SMR reactor, as shown in FIG. 8. The third embodiment of the present invention deals with the process in which methane is separated from carbon monoxide in distillation tower and the two components are then sent to SMR and WGSR, respectively in different recycle systems. The separation of $CH_4$ and CO requires extra energies as shown in energy steams CondE-2 and ReE-2. Since the relative volatility of methane to carbon monoxide is small, the separation requires high cooling energy inputs indicated as ReE-2 and CondE-2. If the energy requirements for WGSR of pure carbon monoxide and SMR of pure methane are not substantially less than those of the reactions for the mixture as shown in FIGS. 6 and 7, then the efficiency of the process shown in FIG. 8 is lower than that of the other two embodiments. That is, the energy saving cannot compensate for the required separation energy (CondE-2 and ReE-2). A comparison of the efficiencies is shown in Table 2. The first and second law efficiencies for Embodiment 3 are 81.85% and 54.00%, respectively, which are lower than those of Embodiment 1 and 2. In addition to the lower efficiency, the process is more complicated and would require a greater capital input.

Figure 9:
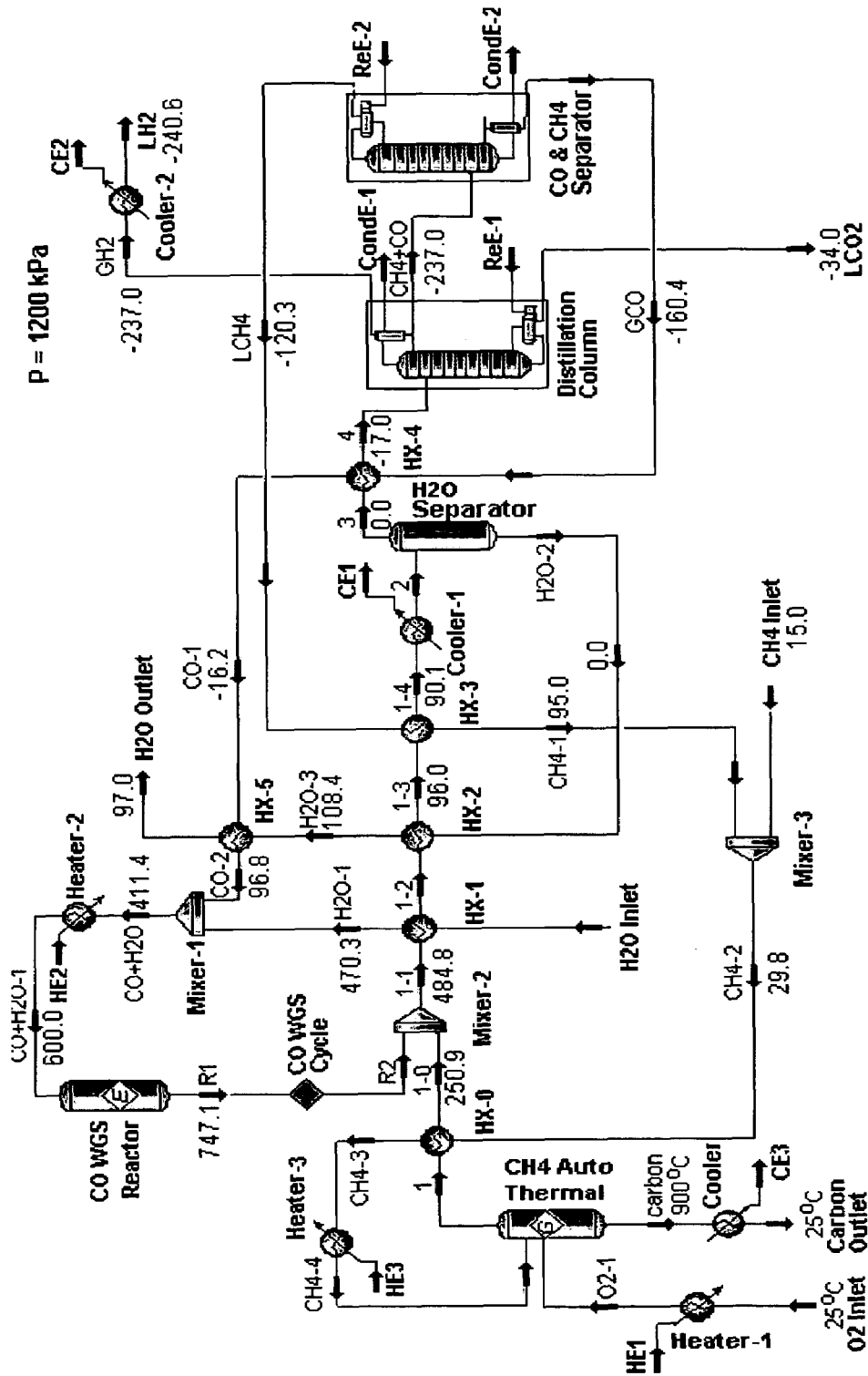
FIG. 9 is a flow diagram of the present invention when carbon monoxide is separated from methane and CO passes through the Water Gas Shift Reactor (WGSR) and methane undergoes pyrolysis. (Embodiment 4)

Embodiment 4 is shown in FIG. 9 where carbon monoxide is separated from methane and sent to WGSR, while methane is sent back to the autothermal reactor for pyrolysis to produce carbon, hydrogen and additional carbon monoxide and carbon dioxide. Since SMR is eliminated, according to the reactions 8 and 9, the methane pyrolytic process produces half as much hydrogen as is produced in SMR.

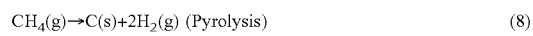

$$CH_4(g) \rightarrow C(s)+2H_2(g) \text{ (Pyrolysis)} \qquad (8)$$

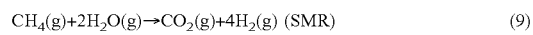

$$CH_4(g)+2H_2O(g) \rightarrow CO_2(g)+4H_2(g) \text{ (SMR)} \qquad (9)$$

Energy requirements and efficiency calculations for Embodiment 4 are listed in Table 1. Since unreacted methane is recycled to the auto-thermal reactor where external energy is not required for SMR, the total energy input for Embodiment 4 is lower than for Embodiments 1, 2 or 3. In addition to the lower total energy input, the carbon dioxide to hydrogen ratio is the lowest among Embodiments 1-4. However, the ratio of the total energy required to $LH_2$ produced is the highest because of more $CH_4$ is converted into carbon. The first law efficiency of Embodiment 4 is the greatest of the four processes while the second law efficiency is the least.

Figure 10:
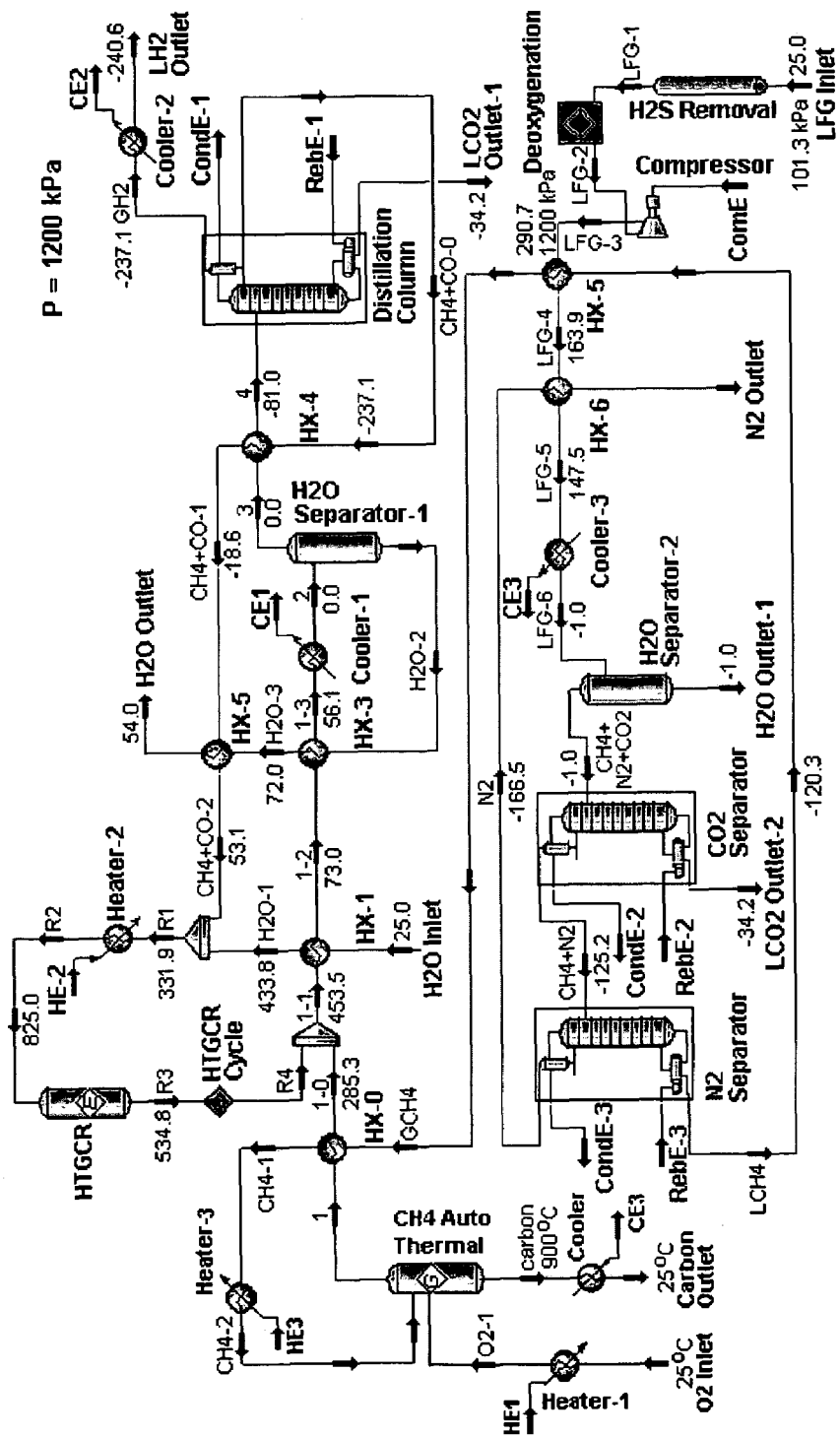
FIG. 10 is a flow diagram of the present invention when liquid hydrogen is produced from landfill gas; no provisions for methane and carbon monoxide separation and the gaseous mixture passes through a high temperature gas conditioning reactor (HTGCR). (Embodiment 5)

In Embodiment 5, liquid hydrogen ($LH_2$) is produced from landfill gas (LFG), as shown in FIG. 10. The components in this embodiment are similar to the components in the other four embodiments except for some additional components that are needed for landfill gas purification.

$H_2S$ removal component can include, but not be limited to, a column for eliminating hydrogen sulfide in the gas Deoxygenation component can include, but not be limited to, a column for removing oxygen gas in the landfill gas Compressor can include, but not limited to, a device used for compressing gas mixture to a high pressure.

HX-5 and HX-6 can include, but are not limited to, a heat exchanger and the like.

Cooler 1, Cooler and Cooler 3 can include, but are not limited to, cryogenic coolers and the like.

$CO_2$ and $N_2$ separators can be cryogenic distillation devices that separate $CO_2$ and $N_2$ from gas mixtures so that pure liquid methane is purified.

One of the main features of Embodiment 5 is the use of a cryogenic separation process to purify LFG, and the feeding of the purified methane to Embodiment 2 (FIG. 8) to produce $LH_2$. Before the cryogenic purification process, sulfur speciation gases must be removed from LFG via a hydrogen sulfide removal operation. A small amount of oxygen must also be removed from LFG prior to the cryogenic separation process. Water concentration in the LFG is calculated with HYSYS™ and is shown in the Landfill Gas Inlet steam. The benefits of the cryogenic LFG purification are obvious. First, methane recovery is up to 99.99% with purity of 99.93% mole fraction. A greater purity can be achieved by adjusting the cooler temperature in the nitrogen ($N_2$) separator. However, the higher purity of methane requires greater energy inputs. For example, when methane purity if 99.93% and nitrogen purity is 99.96%, CondE-3 and ReE-3 are 5246 kJ/hr and 2244 kJ/hr, respectively. If the purities are increased to 99.99% for methane and 99.996% for nitrogen, CondE-3 and ReE-3 abruptly increase to 70410 kJ/hr and 67410 kJ/hr, respectively.

Secondly, in a cryogenic process, individual components can be separated and can serve as co-products to create an extra value for the process, such as high purity nitrogen and carbon dioxide. Energy balance and efficiency calculations are included in Table 1.

Below is a discussion of process efficiencies. Energy steams and efficiency calculations for the five embodiments are summarized in Table 1. Further evaluation of the $LH_2$ production system of the present invention requires a discussion of two different efficiencies. The first law efficiency is defined in Equation 10 and the second law efficiency is defined in Equation 11 below.

$$\eta_{1st} = \frac{n_{Hydrogen} \cdot (\Delta H_{Combustion} + \Delta H_{LH2})_{Hydrogen}}{(n_{Methane} \cdot \Delta H_{Combustion})_{Methane} + \Delta H_{Total}} \times 100\% \quad (10)$$

$$\eta_{2nd} = \frac{n_{Hydrogen} \cdot (\Delta G_f^0 + \Delta H_{LH2} \cdot \eta_{Carnot})}{(n_{Methane} \cdot \Delta H_{Combustion})_{Methane} + \Delta H_{Heating} + \Delta H_C / \eta_C} \times 90\% \quad (11)$$

Methane combustion $\Delta H_{Combustion} = \Delta H^\circ_{298\,K} = 802.6$ kJ/mole and Hydrogen high heating value $\Delta H_{Combustion} = \Delta H^\circ_{f\,298\,K} = 285.9$ kJ/mole. $\eta_{Methane}$ and $\eta_{Hydrogen}$ are methane input moles and moles of hydrogen produced, respectively; $\Delta G^\circ_f (=228.5$ kJ/mole) is the Gibbs free energy change with the formation of one mole of water under conditions where hydrogen and oxygen are subsequently used. While hydrogen cooling and liquefaction energy $(\Delta H_{Cooling} + \Delta H_{Liquefaction})_{Hydrogen}$ can be calculated from FIG. 4, it is equal to $\eta_{Hydrogen} \times 34120$ kJ/hr. Since $LH_2$ can serve as a cold heat source to constitute a heat engine operating between room temperature and −240.6° C., the heat flow from the hot source, $GH_2$ 25° C., to the cold source, $LH_2$ −240.6° C., is $\Delta H_{LH2} = 8147.68$ kJ/mole, with Carnot efficiency of $\eta_{carnot} = (298.15 - 32.55)/298.15 = 0.8908$.

The work produced from the engine can be calculated as: $\Delta H_{LH2} * \eta_{carnot}$. Considering heat losses and leakage in a cryogenic system, the cryogenic process efficiency, $\eta_C$, is estimated to be 30% from input energy to cooling energies required for separation and hydrogen liquefaction. In addition to the energy required for the entire process, heat leakage and heat recovery losses exist throughout the process. If approximately 10% of total heat is lost in the process, the final second law efficiency is calculated as 90% less than its original value (Equation (11)).

The SMR process requires a large portion of energy inputs while on the other hand, the methane autothermal reaction is an energy saving process, reducing the total input energy requirement. A close look at the results of Embodiments 1 and 2 reveals that combining SMR and WGSR into one reactor reduces energy input requirements, thereby increasing first law efficiency.

With regard to the second law efficiency, although the total energy input for Embodiment 4 is the lowest of five embodiments (35947.5 kJ/hr), its second law efficiency is also the lowest (44.83%) because of the low amount of $LH_2$ produced, 0.9506 mole compared to the 1.1852 mole produced in the other four embodiments. The second law efficiencies of Embodiments 1 and 2 are similar, but Embodiment 2 combines SMR and WGSR into one reactor, therefore, resulting in a lower capital cost.

The second law efficiency is determined by total energy inputs and $LH_2$ produced based on the same moles of methane input. Table 2 shows that the cooling energy share of the total energy input is the more important part in the second law efficiency calculation. Improvements of the second law efficiency requires an increase in the activities of the SMR and WGSR reactors.

TABLE 1

| Energy Streams | Embodiments | | | | |
| --- | --- | --- | --- | --- | --- |
| | NO. 1 | No. 2 | No. 3 | No. 4 | No. 5 |
| HE1 (kJ/h) | 2624.0 | 2624.0 | 2624.0 | 3193.0 | 2624.0 |
| HE2 (kJ/h) | 820.0 | 17450.0 | 1574.0 | 5584.0 | 21710.0 |
| HE3 (kJ/h) | 20560.0 | | 23030.0 | | |
| HE4 (kJ/h) | 3452.0 | 3452.0 | 3452.0 | 4200.0 | 3453.0 |
| CE1 (kJ/h) | 5840.0 | 2725.0 | 4813.0 | 11100.0 | 2973.0 |
| CE2 (kJ/h) | 563.6 | 570.7 | 568.4 | 449.8 | 558.2 |
| CE3 (kJ/h) | −3420.0 | −3420.0 | −3420.0 | −4922.0 | −3420.0 |
| CE4 (kJ/h) | | | | | 6705.0 |
| CondE (kJ/h) | 12910.0 | 13010.0 | 20880.0 | 12350.0 | 13060.0 |
| ReE (kJ/h) | 911.5 | 916.3 | 1173.0 | 456.3 | 934.3 |
| CondE-2 (kJ/h) | | | 5369.0 | 2768.0 | 9764.0 |
| ReE-2 (kJ/h) | | | 1576.0 | 768.4 | 1836.0 |
| CondE-3 (kJ/h) | | | | | 5246.0 |
| ReE-3 (kJ/h) | | | | | 2244.0 |
| CompE (kJ/h) | | | | | 11010 |
| Total (kJ/h) | 44261.1 | 37328.0 | 61639.4 | 35947.5 | 78697.5 |
| $LH_2$ (kmol/h) | 1.1852 | 1.1852 | 1.1852 | 0.9506 | 1.1852 |
| $LCO_2$ (kmol/h) | 0.2286 | 0.2286 | 0.2285 | 0.1318 | 0.2290 |
| 1st law Eff. (%) | 85.34 | 86.81 | 81.85 | 87.11 | 78.70 |
| 2nd law Eff. (%) | 55.21 | 56.95 | 52.09 | 44.83 | 50.89 |
| $\Delta H$ (kJ/kmol $LH_2$) | 37345 | 31495 | 52008 | 37816 | 66400 |
| Ratio (CO2/H2) (g/g) | 4.211 | 4.211 | 4.209 | 3.027 | 4.219 |

Total mass balance and methane conversion use Embodiment 2 as an example to calculate component balances. Table 2 shows the total flow rates of input and outlet components.

TABLE 2

Total Mass Balance for Embodiment 2

| Inlet Components (kgmol/h) | | | Outlet Components (kgmol/h) | | | |
| --- | --- | --- | --- | --- | --- | --- |
| $CH_4$ | $O_2$ | $H_2O$ | $LH_2$ | $LCO_2$ | Carbon | $H_2O$ |
| 0.4536 | 0.0907 | 0.7711 | 1.1852 | 0.2290 | 0.2239 | 0.4922 |

The balance calculation is shown below.

Carbon balance=0.4536−0.2290−0.2239=0.0007 kgmole/hr

Hydrogen balance=2*0.4536+(0.7711−0.4922)−1.1852=0.00094 kgmole/hr

Oxygen balance=0.0907+(0.7711−0.4922)/2−0.2290=0.0012 kgmole/hr

Hydrogen produced from methane=2*0.4536=0.09072 kgmole/hr

Hydrogen produced from water=0.711−0.4922=0.2789 kgmole/hr

Hydrogen from methane: total hydrogen=0.9072/1.1852*100=76.5%

Hydrogen from water: total hydrogen=0.2789/1.1852*100=23.5%

The above calculations indicate satisfactory mass balances on input and outlet components. The results also show that more than ¾ of total hydrogen is produced from methane while less than ¼ is from water splitting. With an increase of hydrogen production through methane pyrolysis, the hydrogen to carbon dioxide ratio will be reduced to 4.21 in comparison to SMR, $CH_4+2H_2O=4H_2+CO_2$, from which one half hydrogen is produced from methane and one half from water. Since there is no carbon monoxide or methane discharged during the process, both methane conversions and hydrogen yield achieve 100%. These results further indicate the great advantage of this process.

Stability of a process is one of the most important parameters in measuring the capability of the process to maintain steady state operating conditions when reaction condition changes. Because methane and carbon monoxide are trapped in the cryogenic processes and recycled, the entire process can hold a steady state when, for example, the catalyst is gradually deactivated. The best method to simulate the deactivation of the SMR or WGSR is to change the reaction temperatures. As a result, the conversions of carbon monoxide and methane will vary with the temperature change. The variation of the conversions of SMR or WGSR will, in turn, influence the steady state of the process. Table 3 shows that even with a wide range of WGSR temperatures (500 to 900° C.), $LH_2$ and $LCO_2$ outlets remain unchanged. The total energy to $LH_2$ ratio and system efficiencies vary only slightly. The change of conversions of SMR and WGSR, results in total energy inputs are different. The stability feature of the process shown in this invention is better than hydrogen production via other processes. In addition to the stability discussions above, Table 2 shows one other important fact. There is an optimal WGSR temperature of 650° C. corresponding to the maximum system efficiency of 94.56%.

The development and analyses of flow diagrams illustrate that the proposed processes are unique in combining hydrogen production with hydrogen liquefaction to achieve maximum utilization of cryogenic energy in hydrogen recovery and purification.

Hydrogen recovery from the cryogenic processes is as high as 99.99% with a purity of 99.9999%. Mass balance results indicate that the input methane and landfill gases are up to 99.99% utilized for hydrogen production. Simultaneously with the liquid hydrogen production, high purity carbon dioxide generated from the processes is separated in liquid form and can serve as a co-product or can be sequestered to reduce environmental impact. The intermediate reaction products, carbon monoxide and unreacted methane in the processes can be recycled through Water Gas Shift Reaction (WGSR) and Steam Methane Reforming (SMR) reactors to produce additional hydrogen. The total first law efficiencies of the processes exceed 81% and 79% for methane and landfill gas, respectively. The highest second law efficiency is 57% for methane and 51% for landfill gas under the assumption of a 10% of heat loss and 30% efficiency of cryogenic processes. The weight ratio of carbon dioxide to hydrogen in these processes is 4.21 (g/g). Recy-

TABLE 3

WGSR Temperature Effects on the Stability of Embodiment 2

| Temp. ° C. | HE2 kJ/h | CE1 kJ/h | CE2 kJ/h | CondE kJ/h | ReE kJ/h | $\Delta H_{Total}$ kJ/h | 1-1 flow kgmol/h | LH2 kgmol/h | LCO2 kgmol/h | $\eta_{System}$ (%) | $R_{E/LH2}$ kJ/kgmol | $R_{CO2/H2}$ |
|---|---|---|---|---|---|---|---|---|---|---|---|---|
| 500 | 21740 | −5937.0 | 628.6 | 24300 | 788.3 | 44175.9 | 2.673 | 1.185 | 0.2290 | 84.70 | 37279 | 4.25 |
| 550 | 19800 | −3807.0 | 604.8 | 20580 | 765.6 | 40599.4 | 2.452 | 1.185 | 0.2288 | 85.45 | 34261 | 4.25 |
| 600 | 18500 | −2293.0 | 587.8 | 18110 | 746.7 | 38307.5 | 2.305 | 1.185 | 0.2287 | 85.93 | 32327 | 4.25 |
| 650 | 17750 | −1271.0 | 576.6 | 16530 | 732.3 | 36973.9 | 2.212 | 1.185 | 0.2286 | 86.22 | 31202 | 4.24 |
| 700 | 17960 | −426.2 | 569.9 | 15820 | 724.7 | 37304.4 | 2.170 | 1.185 | 0.2285 | 86.15 | 31481 | 4.24 |
| 750 | 19190 | 396.0 | 566.7 | 15840 | 724.4 | 39373.1 | 2.173 | 1.185 | 0.2285 | 85.71 | 33226 | 4.24 |
| 800 | 20790 | 1322.0 | 564.3 | 16100 | 726.5 | 42158.8 | 2.192 | 1.185 | 0.2285 | 85.12 | 35577 | 4.24 |
| 850 | 22730 | 2470.0 | 561.6 | 16460 | 729.5 | 45607.1 | 2.180 | 1.185 | 0.2286 | 84.40 | 38487 | 4.24 |
| 900 | 24750 | 3689.0 | 558.0 | 16920 | 733.2 | 49306.2 | 2.225 | 1.185 | 0.2286 | 83.65 | 41609 | 4.24 |

Referring now to the ratio of carbon dioxide to hydrogen $R_{CO2/H2}$, carbon dioxide produced from SMR or WGSR can be separated within the system in its pure liquid form so that it can be sequestered or used as a co-product. In this way, the environmental impact of the greenhouse gas produced through the new processes of the present invention can be greatly reduced. However, efforts to minimize $R_{CO2/H2}$ are always important for reducing the greenhouse effect. Table 1 shows the ratios of carbon dioxide to hydrogen for the five embodiments. Except for Embodiment 4, they all have very similar $R_{CO2/H2}$ ratios. If methane is separated from carbon monoxide and recycled to the methane autothermal reactor for pyrolysis, the ratio is greatly reduced. Thus, it is demonstrated that SMR produces high concentrations of carbon dioxide. If one mole of methane is completely converted into hydrogen and carbon dioxide in an SMR, $R_{CO2/H2}$=1*44.010/4/2.016=5.46. The other extreme example is methane totally decomposed to produce carbon and hydrogen according to Reaction: $CH_4 = C + 2H_2$ with $R_{CO2/H2}$=0.00. However, both SMR and pyrolysis require greater energy inputs.

In summary, the present invention shows, for the first time, five embodiments of liquid hydrogen production from methane and landfill gas using cryogenic separation processes. The processes show a highly efficient production of high purity liquid hydrogen for use in fuel cells as well as in propellants for NASA and other hydrogen fuel applications.

cling methane to the autothermal reactor, reduces the carbon dioxide to hydrogen ratio to as low as 3.027 (g/g).

Additionally, the present invention provides a process for zero emission $LH_2$ production directly from methane or landfill gas when the input energy to the system is a renewable energy, such as solar energy. The advantages of the processes disclosed herein, include, but are not limited to, zero emissions, high process efficiency, greater than approximately 85% $1^{st}$ low thermodynamics and greater than approximately 55% $2^{nd}$ law thermodynamics, pure $LCO_2$ and $LH_2$ products, a compact design utilizing a cryogenic system for both liquefaction and separation.

While the invention has been described, disclosed, illustrated and shown in various terms of certain embodiments or modifications which has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A cryogenic method for hydrogen cryogenic liquefaction and hydrogen separation for liquid hydrogen ($LH_2$) production comprising the steps of:
   (a) producing a hydrogen rich gas mixture containing $H_2$, CO, $CO_2$, $CH_4$, $H_2O$ and trace amounts of hydrocarbons;

(b) cryogenically separating the gas mixture of step (a) resulting in $H_2O$, and liquid carbon dioxide ($LCO_2$);
(c) separating low temperature gaseous $H_2$ and gas mixture of CO and $CH_4$;
(d) recycling the CO and $CH_4$ of the gas mixture to further produce hydrogen rich gas;
(e) mixing the hydrogen rich gas from step (d) with the hydrogen rich gas mixture in step (a) to form a closed loop for CO and $CH_4$ gas mixture;
(f) further cooling the low-temperature gaseous hydrogen until it is liquefied; and
(g) producing $LH_2$ without $CO_2$ emission.

2. The method according to claim 1 wherein hydrogen recovery is as high as approximately 99.99% with a purity of approximately 99.9999%.

3. The method according to claim 1 wherein the high purity $LCO_2$ obtained in step (b) is sequestered to avoid emission of greenhouse gas.

4. The method according to claim 1 wherein the high purity $LCO_2$ obtained in step (b) is served as a co-product.

5. The method according to claim 1 wherein the input hydrogen concentration of step (a) is greater than 70% resulting in a cryogenic separation efficiency which exceeds 90%.

6. The method of claim 1, wherein the producing step comprises the step of:
reacting $CH_4$ and water to produce the gas mixture containing $H_2$, CO, $CO_2$, $CH_4$, $H_2O$.

7. The method of claim 1, wherein the producing step comprises the step of:
reacting $CH_4$ and oxygen to produce the gas mixture containing $H_2$, CO, $CO_2$, $CH_4$, $H_2O$.

8. The method of claim 1, wherein the recycling step comprises the steps of:
low temperature reaction of gas mixture of CO and $CH_4$, to convert the CO into $CO_2$ and $H_2$; and
high temperature reaction of gas mixture of CO and $CH_4$, to convert the $CH_4$, into $CO_2$ and $H_2$.

9. The method of claim 1, wherein the recycling step comprises the step of:
reacting the CO and $CH_4$ mixture with water to convert both CO and $CH_4$ into $CO_2$ and $H_2$ simultaneously at one reactor.

10. The method of claim 1, wherein the recycling step comprises the steps of:
separating CO and $CH_4$ mixture into CO and $CH_4$;
reacting the CO with $H_2O$ in a water shift gas reactor to convert the CO into $CO_2$ and $H_2$; and
reforming the $CH_4$ with $H_2O$ at a steam methane reforming reactor to convert the $CH_4$ into $CO_2$ and $H_2$.

11. A method for the production of liquid hydrogen ($LH_2$) from landfill gases (LFG) after the removal of $H_2S$ gas comprising the steps of:
(a) cryogenically separating the landfill gases into components of methane ($CH_4$), nitrogen ($N_2$), liquid carbon dioxide ($LCO_2$) above 95% purity and water;
(b) sending the methane component into an autothermal reactor to produce hydrogen;
(c) sending a remainder of the gas mixture to be cryogenically separated into $LCO_2$ and water;
(d) recycling the gas mixture of CO and $CH_4$ through a steam methane reforming (SMR) reactor to further produce hydrogen; and
(e) cooling the low-temperature gaseous hydrogen until it is liquefied.

12. A method for the production of liquid hydrogen ($LH_2$) from landfill gases (LFG) after the removal of $H_2S$ gas comprising the steps of:
(a) cryogenically separating the landfill gases into components of methane ($CH_4$), nitrogen ($N_2$), liquid carbon dioxide ($LCO_2$) above 95% purity and water;
(b) sending the methane component into an autothermal reactor to produce hydrogen;
(c) sending a remainder of the gas mixture to be cryogenically separated into $LCO_2$ and water;
(d) recycling the gas mixture of CO and $CH_4$ through a combination of a steam methane reforming (SMR) reactor and a water gas shift reaction (WGSR) reactor to further produce hydrogen; and
(e) cooling the low-temperature gaseous hydrogen until it is liquefied.

* * * * *